United States Patent
Yoon et al.

(10) Patent No.: US 9,187,332 B2
(45) Date of Patent: Nov. 17, 2015

(54) GRAPHENE SHEET, GRAPHENE BASE INCLUDING THE SAME, AND METHOD OF PREPARING THE GRAPHENE SHEET

(75) Inventors: Seon-mi Yoon, Yongin-si (KR); Jae-young Choi, Suwon-si (KR); Won-mook Choi, Hwaseong-si (KR); Hyeon-jin Shin, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 234 days.

(21) Appl. No.: 12/915,891

(22) Filed: Oct. 29, 2010

(65) Prior Publication Data

US 2011/0104442 A1 May 5, 2011

Related U.S. Application Data

(63) Continuation of application No. 12/169,114, filed on Jul. 8, 2008, now Pat. No. 7,988,941.

(30) Foreign Application Priority Data

| Oct. 29, 2007 | (KR) | 10-2007-0108860 |
| Mar. 13, 2008 | (KR) | 10-2008-0023457 |
| Oct. 29, 2009 | (KR) | 10-2009-0103555 |

(51) Int. Cl.
| C01B 31/04 | (2006.01) |
| D06N 7/04 | (2006.01) |
| B05D 1/02 | (2006.01) |
| B44C 1/22 | (2006.01) |
| B82Y 30/00 | (2011.01) |
| B82Y 40/00 | (2011.01) |

(52) U.S. Cl.
CPC ............ *C01B 31/0446* (2013.01); *B82Y 30/00* (2013.01); *B82Y 40/00* (2013.01); *C01B 2204/02* (2013.01); *C01B 2204/04* (2013.01); *C01B 2204/32* (2013.01)

(58) Field of Classification Search
None
See application file for complete search history.

(56) References Cited

U.S. PATENT DOCUMENTS

| 5,605,580 | A | 2/1997 | Orita | |
| 5,851,314 | A | 12/1998 | Grafen et al. | |
| 7,232,601 | B2 * | 6/2007 | Mercuri et al. | 428/212 |
| 8,603,608 | B2 * | 12/2013 | Shin et al. | 428/172 |
| 2002/0102447 | A1 * | 8/2002 | Kato | 429/23 |
| 2006/0035085 | A1 * | 2/2006 | Ozaki et al. | 428/408 |
| 2006/0121279 | A1 * | 6/2006 | Petrik | 428/403 |
| 2009/0020764 | A1 | 1/2009 | Anderson et al. | |
| 2009/0110627 | A1 * | 4/2009 | Choi et al. | 423/447.1 |

(Continued)

FOREIGN PATENT DOCUMENTS

| EP | 2281779 A2 | 2/2011 |
| KR | 1020090043418 A | 5/2009 |
| KR | 20090065205 A | 6/2009 |

OTHER PUBLICATIONS

PEM Fuel Cell Electrocatalysts and Catalyst Layers: Fundaments and Applications. Editor: Jiujun Zhang. Publisher: Springer. Copyright 2008. pp. 494-495.*

(Continued)

*Primary Examiner* — David Sample
*Assistant Examiner* — Nicole T Gugliotta
(74) *Attorney, Agent, or Firm* — Cantor Colburn LLP

(57) ABSTRACT

A graphene sheet including graphene comprising ten or fewer wrinkles per 1,000 square micrometers of the graphene.

34 Claims, 10 Drawing Sheets
(5 of 10 Drawing Sheet(s) Filed in Color)

20 MICROMETERS

(56) References Cited

U.S. PATENT DOCUMENTS

2010/0224851 A1 9/2010 Colombo et al.
2010/0255984 A1 10/2010 Sutter et al.

OTHER PUBLICATIONS

EP Extended Search Report dated Apr. 11, 2011 for Application No. 10189217.2-1218.
Yu, Qingkai et al., Graphene Synthesis by Surface Segregation on Ni and Cu, Condensed Matter (2008), 1-13, Apr. 10, 2008.
Juang, Z.Y. et al., Synthesis of graphene on silicon carbide substrates at low temperature, Carbon, vol. 47: 8, 2009, pp. 2026-2031.
Cortright, R. D. et al., Hydrogen from catalytic reforming of biomass-derived hydrocarbons in liquid water, Letters to Nature, 418, 2002, pp. 964-967.
S. Kukielka et al., "Nickel/Hydrogenated Amorphous Carbon Composite Films Deposited in Acetylene/Argon Microwave Plasma Discharge", Rev. Adv. Mater. Sci. 15, 2007, pp. 127-13.
Zhang et al.,"Vacuum-assisted synthesis of graphene from thermal exfoliation and reduction of graphite oxide", Journal of Materials Chemistry, vol. 21, 2011, pp. 5392-5397.

\* cited by examiner

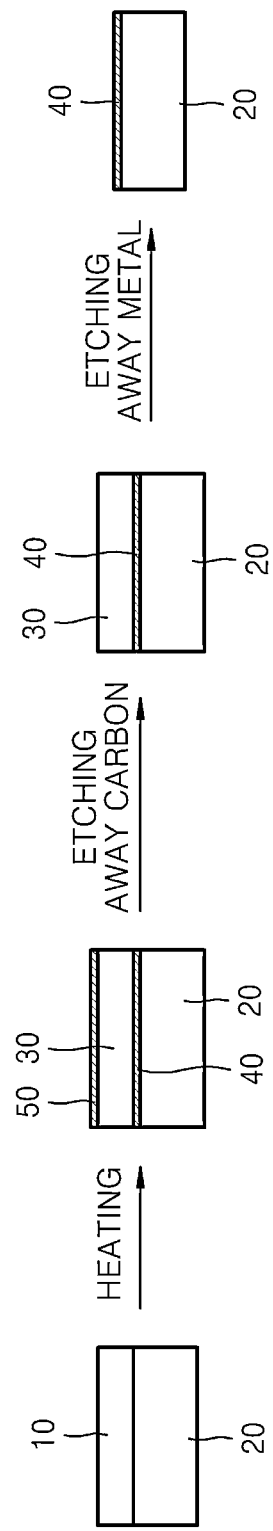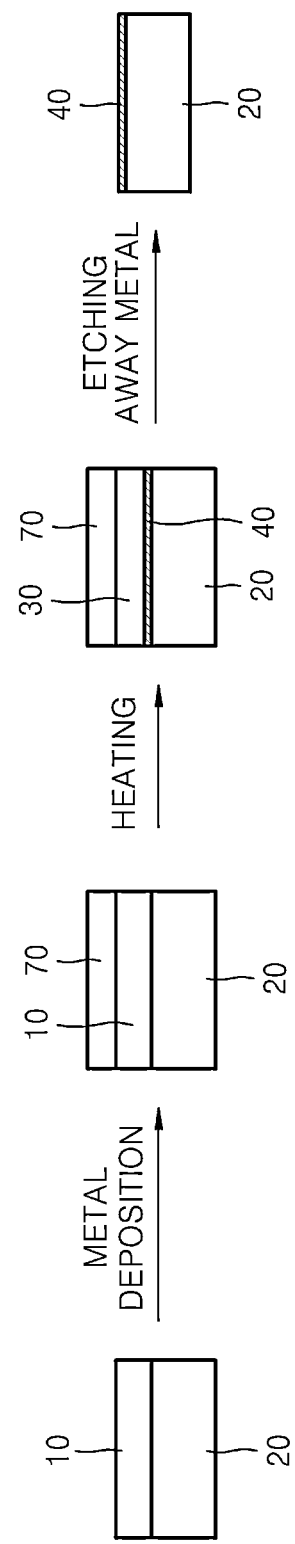

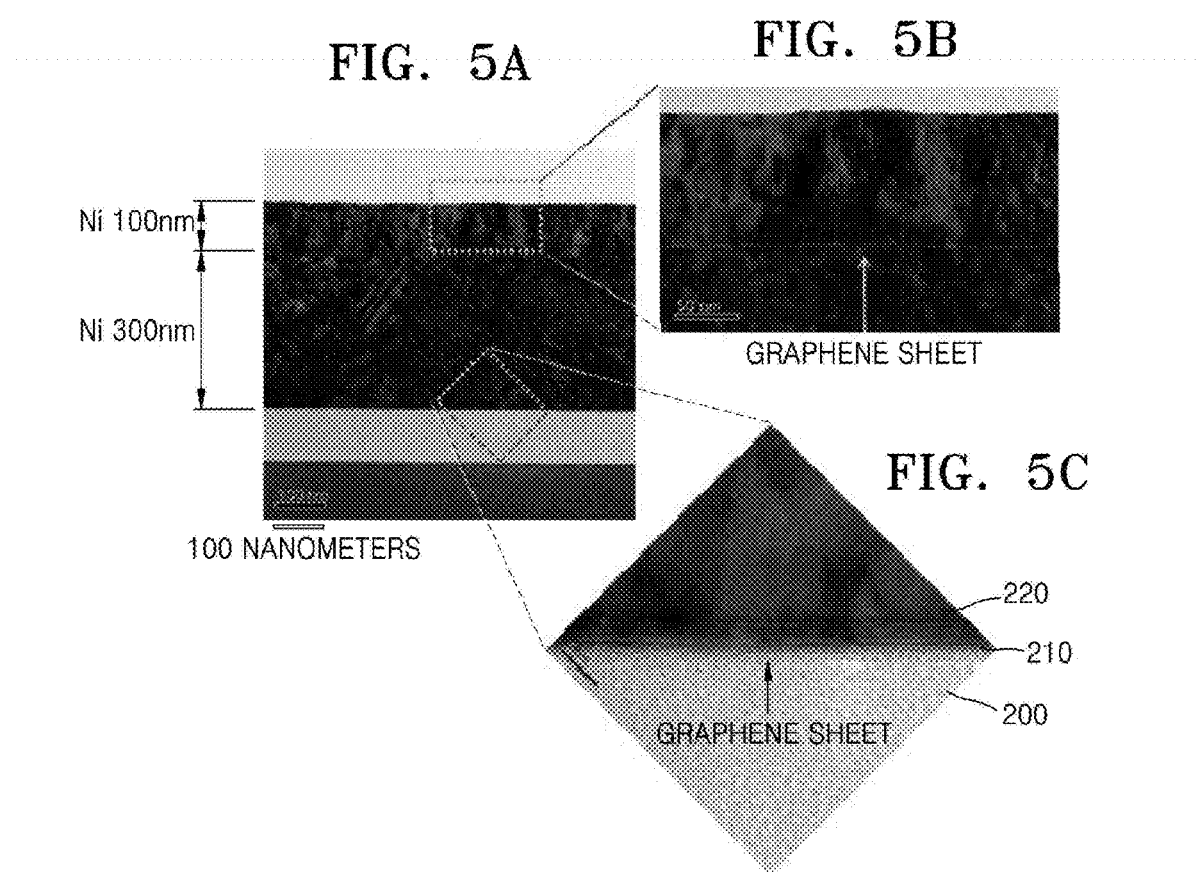

20 MICROMETERS

10 MICROMETERS

10 MICROMETERS

20 MICROMETERS

10 MICROMETERS

GRAPHENE SHEET, GRAPHENE BASE INCLUDING THE SAME, AND METHOD OF PREPARING THE GRAPHENE SHEET

CROSS REFERENCE TO RELATED APPLICATIONS

This application is a continuation application of U.S. patent application Ser. No. 12/169,114, filed on Jul. 8, 2008, which has issued as U.S. Pat. No. 7,988,941, and which claims priority to Korean Patent Application No. 10-2007-0108860, filed on Oct. 29, 2007, and Korean Patent Application No. 10-2008-0023457, filed on Mar. 13, 2008.

BACKGROUND

1. Field

This disclosure relates to a graphene sheet, a graphene base including the graphene sheet, and highly efficient methods of preparing the graphene sheet and the graphene base, whereby multiple graphene sheets may be simultaneously formed directly on a substrate. The graphene sheet may have a large size, fewer defects, and improved quality relative to commercially available graphene.

2. Description of the Related Art

Generally, graphite has a structure in which planar, two-dimensional ("2D") graphene sheets are stacked parallel to each other to form a three-dimensional crystalline material. Each graphene sheet includes carbon atoms linked to each other in a hexagonal configuration. Recently, extensive research on graphite has shown that graphene sheets, which were separated from graphite, have very useful characteristics and are unlike other materials. For example, the electrical characteristics of graphene are anisotropic, and thus depend on the crystallographic orientation of the graphene. The anisotropy enables selection of the electric characteristics by using graphene in a selected direction. Thus, a device having selected electrical characteristics may be provided by using the graphene in a selected crystallographic orientation. Graphene sheets are therefore useful for carbon-based electrical devices or carbon-based electromagnetic devices.

However, currently it is difficult to prepare a large-sized graphene sheet with sufficiently few defects, and it is even more difficult to directly form such a graphene sheet on a substrate without transferring the graphene from another material. Thus there remains a need for a large graphene sheet having fewer defects, and a method of forming the graphene sheet which avoids transferring the graphene sheet, such as transferring the graphene sheet from a material on which it is formed to a substrate for a device, for example.

SUMMARY

Provided is a graphene sheet having a large size, fewer defects, and a high graphene coverage.

Provided is a graphene base including the graphene sheet disposed directly on a substrate.

Provided is a method of preparing the graphene sheet.

Additional aspects will be set forth in part in the description which follows and, in part, will be apparent from the description.

According to an aspect, disclosed is a graphene sheet including graphene including ten or fewer wrinkles per 1,000 square micrometers of the graphene.

The graphene sheet may have an area of 1 mm$^2$ or greater.

According to another aspect, a graphene base includes: a substrate; and a graphene sheet directly on a surface of the substrate, the graphene sheet including graphene and having ten or fewer wrinkles per 1,000 square micrometers of the graphene sheet.

Also disclosed is a graphene sheet including: graphene, wherein a graphene coverage of the graphene sheet is about 99% or greater per 1 square millimeter area of the graphene sheet.

According to another aspect, a graphene base includes: a substrate; and a graphene sheet directly on a surface of the substrate, wherein a graphene coverage of the graphene sheet is about 99 percent or greater per 1 square millimeter area of the graphene sheet.

According to another aspect, disclosed is a graphene base including: a substrate; a first graphene sheet disposed on at least one surface of the substrate; a metal layer disposed on the first graphene sheet; and a second graphene sheet disposed on the metal layer.

According to another aspect, a method of preparing a graphene sheet includes: forming a carbon incorporated metal layer on at least one surface of a substrate; and thermally treating the substrate and the carbon incorporated metal layer to form first and second graphene sheets on opposite surfaces of the metal layer.

Also disclosed is a graphene base including: a substrate having a side forming an angle with respect to a surface of the substrate; and a graphene sheet disposed on the side of the substrate.

These and other features, aspects, and advantages of the disclosed embodiments will become better understood with reference to the following description and appended claims.

BRIEF DESCRIPTION OF THE DRAWINGS

The patent or application file contains at least one drawing executed in color. Copies of this patent or patent application publication with color drawings will be provided by the Office upon request and payment of the necessary fee.

These and/or other aspects will become apparent and more readily appreciated from the following description of the embodiments, taken in conjunction with the accompanying drawings in which:

FIGS. 4A and 4B are each a diagram of an embodiment of a method of selectively preparing a graphene sheet grown directly on a substrate;

FIG. 5A is a transmission electron micrograph of a cross-section of a graphene base prepared in Example 1;

FIG. 5B is an enlarged view of an interface between a nickel film and additionally deposited Ni layer, which is an upper portion of FIG. 5A;

FIG. 5C is an enlarged view of the interface between the substrate and the Ni film, which is a lower portion

DETAILED DESCRIPTION

Figure 1:
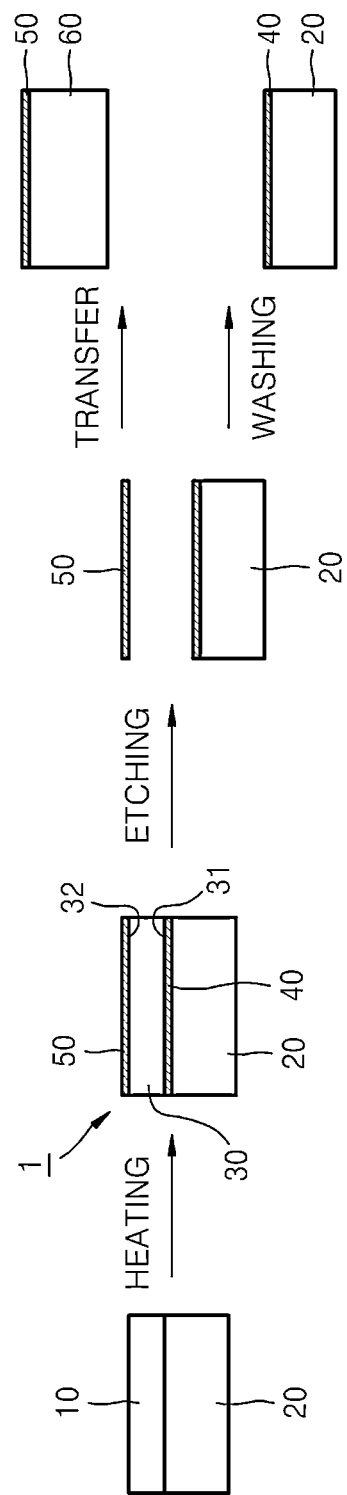
FIG. 1 is a diagram of an embodiment of a method of preparing a graphene sheet.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes," and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It has been observed that a short circuit, which may occur when fabricating a device with a graphene sheet, may result from a defect, specifically a wrinkle, in the graphene sheet. While not wanting to be bound by theory, it is believed that the wrinkle results in roughness, which causes irregular deposition of subsequent layers of the device, and the irregular deposition results in a defective device from a short circuit, for example. Thus it has been surprisingly observed that the wrinkle in the graphene sheet may be a root cause of failure of the device using the graphene sheet.

According to an aspect, a graphene sheet includes fewer defects and has improved coverage. As used herein, coverage refers to portion of an area of a graphene sheet which is graphene. Thus a graphene sheet having a graphene coverage of 99% would have 99% of its area being graphene. Also, in an aspect, disclosed is a method of preparing a graphene sheet having no wrinkles, or a reduced content of wrinkles. Also disclosed is a method of disposing the graphene sheet on a substrate.

The term "graphene" as used herein refers to a polycyclic aromatic molecule formed of a plurality of covalently bonded carbon atoms. The covalently bonded carbon atoms may form a six-membered ring as a repeating unit, and may further include at least one of a five-membered ring or a seven-membered ring. Thus, the graphene appears as a single layer of covalently bonded carbon atoms, and each carbon atom may be sp$^2$ hybridized. A graphene sheet may comprise a single layer of graphene. Alternatively, the graphene sheet may comprise multiple layers of graphene which are stacked upon one another. In this regard, the graphene sheet may have a maximum thickness of about 100 nanometers (nm).

The graphene sheet may include 1 to about 300 layers of graphene, specifically 1 to about 100 layers of graphene, more specifically 1 to about 10 layers of graphene. If the number of layers of graphene is within this range, the desirable electrical characteristics of the graphene may be maintained in the graphene sheet.

The homogeneity of a graphene sheet may be described by the number of wrinkles per unit area of the graphene sheet. As used herein, a wrinkle in a graphene sheet refers to a ridge or furrow in the graphene sheet, as may result from contraction or folding of the graphene sheet, contraction or folding of a graphene layer of the graphene sheet, or as may result from a discontinuity in the carbon lattice structure of the graphene sheet. While not wanting to be bound by theory, it is understood that the wrinkle may be formed during formation of the graphene. The wrinkle may also be formed during the preparation of a graphene sheet, and in particular may be formed when separating or transferring the graphene sheet. Also, the wrinkle may be generated if graphene is not uniformly grown in a particular area when growing the graphene. The wrinkle is more likely to occur in a large graphene sheet. Also, a graphene sheet having fewer wrinkles provides a more homogeneous graphene sheet having better electrical characteristics.

The graphene sheet may have about 10 or fewer wrinkles, specifically about 5 or fewer wrinkles, more specifically about 3 or fewer wrinkles, per 1000 square micrometers ($\mu m^2$) of the graphene sheet. In an embodiment, the graphene sheet may comprise 1 to about 10 wrinkles, specifically 1 to about 5 wrinkles, more specifically about 2 to about 3 wrinkles per 1000 $\mu m^2$ of the graphene sheet.

The graphene sheet may have an area of about 1 square millimeter ($mm^2$) or greater, specifically an area of about 1 $mm^2$ to about 100 square meters ($m^2$), more specifically about an area of about 1 $mm^2$ to about 25 $m^2$.

The graphene sheet may comprise about 99 percent (%) or greater graphene, specifically about 99% to about 99.999% graphene, more specifically about 99.9% to about 99.99% graphene, per 1 $mm^2$ of the graphene sheet. The graphene sheet may consist essentially of, or consist of, graphene. If graphene is present in this range, the graphene sheet may be homogeneous, and thus may have uniform electrical characteristics.

The graphene sheet may have a graphene coverage of about 99 percent (%), specifically about 99% to about 99.999%, more specifically about 99.9% to about 99.99%, per 1 $mm^2$ of the graphene sheet. If graphene coverage in this range, the graphene sheet may have desirable electrical characteristics.

The graphene sheet may have any shape, and is not limited to a specific shape. For example, the graphene sheet may have a circular shape, a rectangular shape, a polygonal shape, an irregular shape, or a three-dimensional shape. In this regard, the size of the graphene sheet may be determined based on lateral and longitudinal lengths measured at an appropriate location according to the shape of the graphite sheet. For example, for a graphene sheet having a circular shape, the lateral and longitudinal dimensions of the graphite sheet may correspond to a diameter of the circular graphene sheet. For a graphene sheet having an oval shape, the lateral and longitudinal dimensions of the graphite sheet may correspond to major and minor axes of the oval graphene sheet, respectively. For a graphene sheet having a polygonal shape, the lateral and longitudinal dimensions of the graphite sheet may correspond to the longest and shortest axes of the polygonal graphene sheet, respectively. The lateral and longitudinal dimensions of the graphene sheet may each independently be equal to about 1 millimeter (mm) or greater, specifically about 1 mm to about 100 meters (m), more specifically about 2 mm to about 1 m. For example, the lateral and longitudinal dimensions may each independently be about 1 mm to about 10 m, or about 1 mm to about 5 m.

A wrinkle or an empty space in the graphene sheet may be determined by optical microscopy or by scanning electron microscopy. In addition, a crystallographic orientation of graphene in the graphene sheet may be determined from a Raman spectrum of the graphene sheet. Also, while not wanting to be bound by theory, it is understood that the presence of a D-band in the Raman spectrum implies that the graphene sheet includes a defect, and that the intensity of the D-band in a Raman spectrum of the graphene sheet may be used to determine the content of the defect, if present. Thus a high peak intensity of the D-band may be construed as indicating that the graphene sheet includes a large number of defects. On the other hand, a lower or absence of the D-band may be construed as indicating that the graphene sheet includes few or 0 defects.

The graphene sheet may have a D-band to G-band peak ratio about 0.5 or less. For example, the D-band to G-band peak ratio may be about 0.01 or less, or about 0.001 or less, and may be zero, which would indicate that the graphene sheet does not include a defect. The D-band to G-band peak ratio may be 0 to about 0.5, specifically 0 to about 0.01, more specifically about 0.00001 to about 0.001.

The graphene sheet may be grown independently or may be grown on a substrate. The term "graphene base" as used throughout the specification refers to a substrate and a graphene sheet disposed on the substrate.

The substrate may be a substrate on which graphene is directly grown or may be a substrate with a graphene sheet which has been transferred from another substrate on which the graphene was grown.

The substrate and the graphene sheet may be chemically or physically directly combined with each other. For a substrate on which graphene is grown in-situ, a bond between the substrate and the graphene sheet may be stronger than a bond between a graphene sheet and a substrate to which the graphene sheet is transferred. While not wanting to be bound by theory, it is understood that the stronger bond may be due a bond which is formed upon heating at a temperature at which the graphene is grown.

In an embodiment, a first graphene sheet and a second graphene sheet may be simultaneously prepared: the first graphene sheet grown directly on the substrate, and the second graphene sheet grown directly on a first metal layer and on a side of the first metal layer opposite the substrate. The first graphene sheet, which is grown directly on the substrate, may be used directly for a device without a separation process, and may include fewer defects, wherein a defect may be a wrinkle, for example, and wherein such a defect is understood to likely occur when a graphene sheet is transferred to a separate substrate.

At least one of the first and second graphene sheets may have a same shape as the substrate. For example, if the substrate has a patterned shape, at least one of the first and the second graphene sheets may have the same patterned shape as the substrate. For example, at least one of the first and the second graphene sheets may have a linear shape, like that of an electronic circuit, an irregular shape, a circular shape, an oval shape, or a rectangular shape. Also, a plurality of first graphene sheets may be formed on the substrate. In addition, at least one of the first and the second graphene sheets may be disposed (e.g., formed) on a portion of the substrate. For example, if a substrate has a projection or a recession, at least one of the first and the second graphene sheets may be selectively formed on a side of the projection or the recession at an angle with respect to the surface of the substrate.

The substrate may include a metal, a non-metal, or a combination thereof to provide a stacked or layered substrate, wherein each layer of the layered substrate comprises at least one of the metal or the non-metal. The non-metal may comprise an inorganic material, and each non-metal may independently comprise, for example, silicon (Si), a glass, GaN, silica, an oxide, a nitride, or a combination comprising at least one of the foregoing. Thus, in an embodiment, the substrate may comprise a silicon layer and a silica layer on the silicon layer. The metal may comprise at least one of nickel (Ni), cobalt (Co), iron (Fe), platinum (Pt), palladium (Pd), gold (Au), aluminum (Al), chromium (Cr), copper (Cu), manganese (Mn), molybdenum (Mo), rhodium (Rh), iridium (Ir), tantalum (Ta), titanium (Ti), tungsten (W), uranium (U), vanadium (V), or zirconium (Zr).

According to another aspect, a graphene base 1 includes a first graphene sheet 40 disposed on at least one surface of a first substrate 20, a first metal layer 30 disposed on the first graphene sheet 40, and a second graphene sheet 50 disposed on the first metal layer 30.

The first graphene sheet 40 is grown directly on the first substrate 20 in-situ, and is bound to the first substrate 20 by a strong chemical or physical bond. The first metal layer, which is on the first graphene sheet 40, may comprise a graphitizing catalyst layer, and may have a thickness of about 10 nanometers (nm) to about 1 μm, specifically about 20 nm to about 500 nm, more specifically about 40 nm to about 250 nm. The first metal layer 30 may further contain unreacted carbon. The second graphene sheet 50 is grown directly on the first metal layer 30 in-situ. The second graphene sheet 50 may be simultaneously formed with the first graphene sheet 40, and thus, the preparation efficiency of the graphene sheet may be improved.

In an embodiment, the first graphene sheet 40 and the second graphene sheet 50 are formed as a carbonaceous component of a carbon-containing metal ("C-metal") layer 10 diffuses out of the C-metal layer to provide the first graphene sheet 40 and the second graphene sheet 50 on the first metal layer, wherein the first metal layer results from the C-metal layer. Because the first graphene sheet 40 and the second graphene sheet 50 are formed from the C-metal layer, the first graphene sheet and the second graphene sheet may have a patterned shape corresponding to a patterned shape of the C-metal layer.

Thus if the C-metal layer has a patterned shape, the first graphene sheet and the second graphene sheet may have a patterned shape corresponding to the patterned shape of the C-metal layer. Also, the first metal layer may have a patterned shape corresponding to the patterned shape of the C-metal layer. Furthermore, the C-metal layer (and thus the first metal layer) may be disposed (e.g., formed) on the substrate, and thus the C-metal layer (and the first metal layer) may have a same shape as the substrate.

The substrate of the graphene base may include any of the substrates listed above in connection with the graphene sheet. In addition, the first and second graphene sheets of the graphene base may have the same characteristics as the graphene sheet disclosed above in terms of the homogeneity or content of graphene wrinkles, the graphene coverage, the thickness, or the area of the graphene sheet, for example.

Hereinafter, a method of preparing the graphene sheet and the graphene base will now be further disclosed with reference to FIG. 1.

First, a carbon-containing metal ("C-metal") layer 10 is disposed (e.g., formed) on at least one surface of a first substrate 20, and then thermally treated (i.e., heated) to grow graphene on opposite surfaces of the C-metal layer 10, to provide a first metal layer 30 having a first graphene sheet 40 on a first side 31 of the first metal layer 30, which is adjacent to the first substrate 20, and a second graphene sheet 50 on a second side 32 of the first metal layer 30, wherein the second side 32 is opposite the first side 31.

The C-metal layer 10 collectively refers to either a metal layer including carbon in a metal lattice thereof or a metal layer including lattice-structured carbon in metal. Thus the C-metal layer 10 may comprise a metal having carbon inclusions or a carbide, such as a metal carbide, for example. The C-metal layer 10 may be formed by carburization or by deposition, for example.

Figure 2:
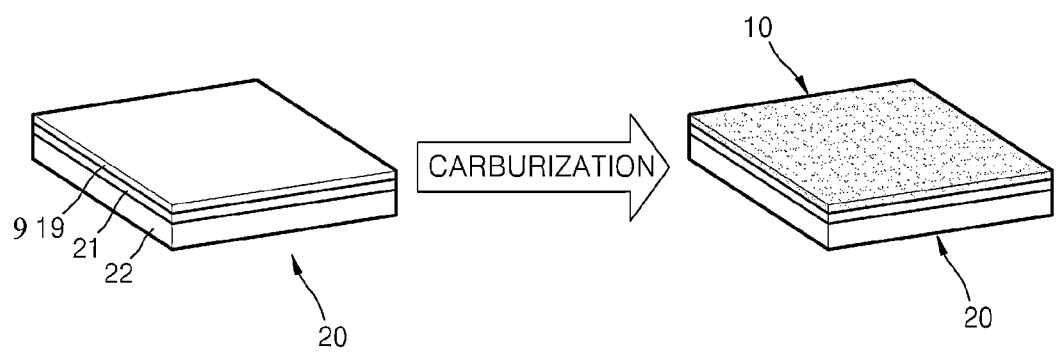
FIG. 2 is a diagram of an embodiment of a method of forming a carbon-containing metal layer by carburization.

As illustrated in FIG. 2, carburization may include forming a precursor metal layer 9 on the first substrate 20 and contacting the precursor metal layer 9 with a carbonaceous material to cause carbon to permeate into the precursor metal layer 9 to form the C-metal layer 10. The carbon may be permeated in any way, for example, by a liquid phase carburization method or a vapor phase carburization method.

The liquid phase carburization method may include forming a precursor metal layer 9 on the first substrate 20 and pre-heating the precursor metal layer 9 while in contact with a hydrocarbon, such as an oxygenated hydrocarbon. In an embodiment, the precursor metal layer 9 may be pre-heated in a solution comprising the oxygenated hydrocarbon. The precursor metal layer 9 comprises a graphitizing catalyst. The precursor metal layer 9 may have a thickness of about 10 nm to about 1 μm, specifically about 20 nm to about 500 nm, more specifically about 40 nm to about 250 nm.

The hydrocarbon or oxygenated hydrocarbon used in the liquid phase carburization method may be any organic solvent containing carbon which may be thermally decomposed by a reaction with the graphitizing catalyst included in the metal layer. The hydrocarbon may be a polar organic solvent or non-polar organic solvent having a boiling point of about 60 to about 400° C., specifically about 70 to about 380° C., more specifically about 80 to about 360° C. Examples of the organic solvent may include an alcohol, an ether, a ketone, an ester, or an organic acid. An alcohol or an ether may be used in consideration of reactivity and reducing power. Examples of the alcohol include a monovalent alcohol or a polyvalent alcohol, which may be used alone or in a combination thereof. Examples of the monovalent alcohol include propanol, pentaol, hexanol, heptanol, or octanol, or a combination comprising at least one of the foregoing, and examples of the polyvalent alcohol include propylene glycol, diethylene glycol, dipropylene glycol, triethylene glycol, tripropylene glycol, octylene glycol, tetraethylene glycol, neopentyl glycol, 1,2-butandiol, 1,3-butandiol, 1,4-butandiol, 2,3-butandiol, dimethyl-2,2-butandiol, or dimethyl-2,2-butandiol, or a combination comprising at least one of the foregoing. The monovalent alcohol or the polyvalent alcohol may further include an ether group, in addition to a hydroxyl group.

The hydrocarbon used in the liquid phase carburization method may be used alone or in a combination with a base. If a base is further added, the catalytic decomposition reaction may be facilitated, and thus the duration of the carburization may be shortened. The base may be added alone, or in a combination with water in order to increase a solubility of the base. The base may be at least one of an organic base or an inorganic base, and may be, for example, tetramethylammonium chloride ("TMAH"), sodium hydroxide, or potassium hydroxide, or a combination comprising at least one of the foregoing.

When a liquid hydrocarbon is used, the metal layer may be carburized by pre-heating. The liquid hydrocarbon material may be thermally decomposed during the pre-heating due to a reaction with the graphitizing catalyst contained in the precursor metal layer 9. A process for thermally decomposing a liquid hydrocarbon with a graphitizing catalyst has been described by Cortright et al., R. D. Cortright, R. R. Davda and J. A. Dumesic, Hydrogen from catalytic reforming of biomass-derived hydrocarbons in liquid water, Nature, Vol. 418, page 964-967, 29 Aug. 2002, the content of which, in its entirety, is incorporated herein by reference. For example, thermal decomposition products of an organic solvent, such as polyvalent alcohol, may include an alkane, $H_2$, $CO_2$, or H₂O, and a carbon component of the thermal decomposition product may permeate into the precursor metal layer 9 to form the C-metal layer 10.

The preheating for thermally decomposing the liquid hydrocarbon may be performed with stirring in order to allow the liquid hydrocarbon and the precursor metal layer 9 to sufficiently contact each other. The preheating may be performed at a temperature of about 100 to about 400° C., specifically about 110 to about 380° C., more specifically about 120 to about 360° C., for about 1 to about 200 hours, specifically about 2 to about 180 hours, more specifically about 4 to about 160 hours. If the preheating temperature is within this range, the liquid hydrocarbon may be sufficiently thermally decomposed without causing the precursor metal layer 9 to deform.

The first substrate 20 may comprise a first layer 21 and a second layer 22. Each of the first layer 21 and the second layer 22 may independently comprise a metal, a non-metal, or a combination thereof. The metal may comprise at least one of nickel (Ni), cobalt (Co), iron (Fe), platinum (Pt), palladium (Pd), gold (Au), aluminum (Al), chromium (Cr), copper (Cu), manganese (Mn), molybdenum (Mo), rhodium (Rh), iridium (Ir), tantalum (Ta), titanium (Ti), tungsten (W), uranium (U), vanadium (V), or zirconium (Zr). The non-metal may comprise silicon (Si), a glass, GaN, silica, an oxide, a nitride, or a combination comprising at least one of the foregoing.

Examples of the vapor phase carburization method may include gas carburization and plasma carburization.

In the vapor phase carburization method, a carbonaceous material is permeated into the precursor metal layer 9, which is on the first substrate 20. The carbonaceous material is a source of carbon and may contact the precursor metal layer 9 as a vapor. The carbonaceous material may be a compound including seven or fewer carbon atoms, a compound including four or fewer carbon atoms, or a compound including two or fewer carbon atoms. For example, the carbonaceous material may be at least one of carbon monoxide, methane, ethane, methylene, ethylene, methanol, ethanol, acetylene, propane, propylene, butane, butadiene, pentane, pentene, cyclopentadiene, hexane, cyclohexane, benzene, or toluene. The carbonaceous material may be any carbonaceous material having a vapor pressure of about 0.1 kiloPascal (kPa) to about 5 MPa at 20° C., specifically about 1 kPa to about 3 MPa at 20° C., more specifically about 10 kPa to about 1 MPa at 20° C. In another embodiment, the carbonaceous material may be a substituted or unsubstituted C1 to C18 hydrocarbon, or a substituted or unsubstituted C1 to C12 hydrocarbon, for example.

The carbonaceous material may be added to (e.g., injected into) a chamber in which the substrate and the precursor metal layer 9 are disposed. The carbonaceous material may be used alone or in a combination with an inert gas, such as helium or argon.

Alternatively, hydrogen may be further used together with the carbonaceous material. While not wanting to be bound by theory, it is believed that hydrogen maintains a cleanliness of a surface of the precursor metal layer 9, which comprises the graphitizing catalyst, and thus may control the reaction of the carbonaceous material with the precursor metal layer 9. Hydrogen may be used in a content of about 1 to about 40% by volume, specifically about 10 to about 30% by volume, more specifically about 15 to about 25% by volume, based on the total volume of the chamber.

In order to effectively carburize the precursor metal layer 9, carburization may be performed at a temperature of about 100 to about 600° C., specifically about 110 to about 580° C., more specifically about 120 to about 560° C., and may be followed by cooling at a cooling rate of about 1 to about 100° C. per minute (° C./min), specifically about 2 to about 50° C./min, more specifically about 10° C. or fewer ° C./min. In plasma carburization, a reactivity of the carbonaceous material used as a source of carbon may be increased by a plasma. The plasma may be a plasma of the carbonaceous material, a plasma of a gas, such as nitrogen, or a plasma of a combination comprising at least one of the foregoing. Thus, the carburization may be performed at a temperature of about room temperature to about 600° C., followed by cooling at a cooling rate of about 10° C. or fewer per minute to carburize the precursor metal layer 9.

Figure 3:
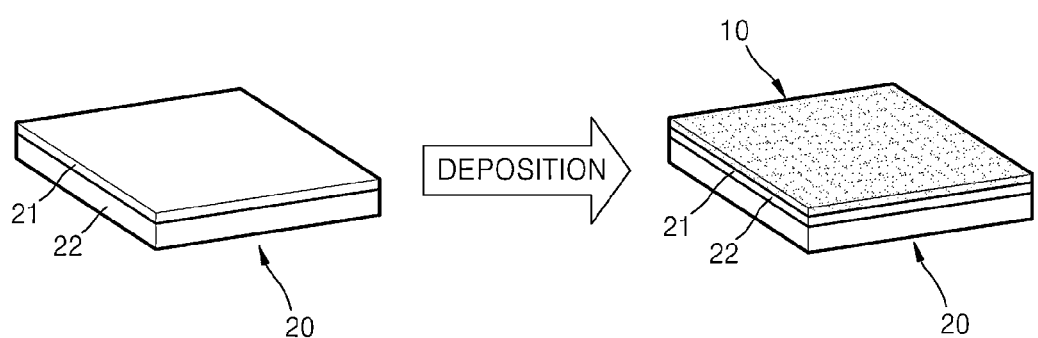
FIG. 3 is a diagram of an embodiment of a method of forming a carbon-containing metal layer by deposition.

The C-metal layer 10 may also be formed by deposition, wherein the deposition method may include atomic layer deposition ("ALD"), or sputtering, for example. Referring to FIG. 3, the C-metal layer 10 may be deposited on the first substrate 20 by concurrently using a metal source and a carbon source to deposit the C-metal layer 10. A material comprising a metal and carbon may be both the metal source and the carbon source. Thus, for example, the C-metal layer 10 may be deposited by sputtering a metal source and a carbon source concurrently, or by sputtering a metal carbide target, wherein the metal carbide serves as the metal source and the carbon source.

An example of the carbon source to be sputtered together with the metal source may include a solid phase carbon source, such as natural graphite, artificial graphite, or other form of graphite, or a gas phase carbon source, such as methane, methylene, ethylene, or acetylene, or a combination comprising at least one of the foregoing. The carbon source may also be the carbonaceous material disclosed above in conjunction with the vapor phase carburization method. Thus the carbon source may be at least one of carbon monoxide, methane, ethane, methylene, ethylene, methanol, ethanol, acetylene, propane, propylene, butane, butadiene, pentane, pentene, cyclopentadiene, hexane, cyclohexane, benzene, or toluene. Also, the carbonaceous material may be a substituted or unsubstituted C1 to C18 hydrocarbon, or a substituted or unsubstituted C1 to C12 hydrocarbon, for example.

The metal source may comprise an alloy or a pure metal, and may comprise a transition metal. The metal source may comprise at least one metal of nickel (Ni), cobalt (Co), iron (Fe), platinum (Pt), palladium (Pd), gold (Au), aluminum (Al), chromium (Cr), copper (Cu), magnesium (Mg), manganese (Mn), molybdenum (Mo), rhodium (Rh), silicon (Si), iridium (Ir), tantalum (Ta), titanium (Ti), tungsten (W), uranium (U), vanadium (V), or zirconium (Zr), or an alloy thereof, or a combination comprising at least one of the foregoing. In an embodiment, the metal source may comprise an element of Groups 3 to 12, specifically an element of Groups 4 to 11, or a combination comprising at least one of the foregoing.

As is further disclosed above in conjunction with the disclosure of the carburization method, the first substrate 20 may comprise a first layer 21 and a second layer 22.

In addition, when a carburization method is used, the amount of carbon in the C-metal layer 10 may be selected by varying the degree of carburization. Thus, the thickness of the graphene layer formed in a subsequent process may also be selected. For example, if a liquid hydrocarbon material that is prone to thermal decomposition is used as the oxygenated hydrocarbon, a large amount of carbon may be decomposed and permeated into the precursor metal layer 9, which comprises the graphitizing catalyst, during the thermal decomposition reaction of the oxygenated hydrocarbon. In addition, the amount of carbon permeated into the precursor metal layer 9 may also be selected by varying the preheating temperature and a duration of the preheating. Thus, a rate of growth of the graphene may be controlled. Thus, it may be easier to select the thickness of a graphene layer of a graphene sheet by selection of the carbonaceous material. Alternatively, when a deposition or other sputtering method is used, the amount of carbon in the C-metal layer 10 may be selected by varying the sputtering power if a solid carbon source is used, or by varying a flow rate of a carrier gas or a flow rate of the carbonaceous material if a volatile carbonaceous material is used.

The precursor metal layer which is treated by, for example, carburization or deposition, to provide the C-metal layer 10 may comprise a graphitizing catalyst. In an embodiment, the precursor metal layer 9 consists essentially of, or consists of, the graphitizing catalyst. While not wanting to be bound by theory, the graphitizing catalyst is understood to help carbon atoms link together to form a planar hexagonal structure. Examples of the graphitizing catalyst may include a catalyst to induce graphite synthesis, a catalyst to induce carbonization, or a catalyst to induce carbon nanotube synthesis. For example, the metal used for the C-metal layer (e.g., the graphitizing catalyst) may comprise at least one metal of nickel (Ni), cobalt (Co), iron (Fe), platinum (Pt), palladium (Pd), gold (Au), aluminum (Al), chromium (Cr), copper (Cu), magnesium (Mg), manganese (Mn), molybdenum (Mo), rhodium (Rh), silicon (Si), iridium (Ir), tantalum (Ta), titanium (Ti), tungsten (W), uranium (U), vanadium (V), or zirconium (Zr), or an alloy thereof, or a combination comprising at least one of the foregoing.

After the formation of the C-metal layer 10 on the first substrate 20, as is further disclosed above, the C-metal layer 10 is thermally treated to form graphene. In particular, the C-metal layer 10 is thermally treated at a temperature at which graphene may grow, so that carbon diffuses out of the metal lattice structure to grow graphene on opposite surfaces of the C-metal layer to provide a first metal layer 30 interposed between the first graphene sheet 40 and the second graphene sheet 50. The graphene may grow in-situ, and forms a graphene sheet. The thermal treatment may be performed in an inert atmosphere or a reducing atmosphere in order to substantially or effectively prevent oxidation of the carbon. The atmosphere may thus comprise an inert gas, such as helium or argon, and the atmosphere may comprise hydrogen. Thus the thermal treatment causes the carbon to diffuse out of the C-metal layer 10, covalently bind together, and form graphene having a planar hexagonal structure on the first substrate 20.

The thermal treatment may be performed at a temperature of about 350 to about 2,000° C., specifically about 400 to about 1,900° C., more specifically about 500 to about 1,800° C. The thermal treatment may be performed for about 0.01 to about 10 hours, specifically for about 0.1 to about 8 hours, more specifically for about 0.5 to about 6 hours. If the duration of the thermal treatment is within this range, sufficient crystallization of the carbon may be attained to provide graphene. The degree of crystallization of the graphene layer may be selected by varying the heat treatment temperature. In addition, the number of graphene layers constituting the graphene sheet may be selected by varying the heat treatment temperature and duration to select a diffusion rate of carbon. For example, if the thermal treatment is performed at a given temperature for a short time to grow graphene, a fewer number of graphene layers may be formed because a smaller amount of carbon may diffuse out of the C-metal layer 10, compared to when the thermal treatment is conducted for a longer time at the given temperature.

Furthermore, if the C-metal layer 10 melts during the thermal treatment, the surface of the C-metal layer 10 may become rough or a particle may form, and a graphene sheet may not form on the rough or particle containing metal layer surface. Thus, it may be desirable to maintain the C-metal layer 10 as a film by selection of the conditions of the heat treatment.

A heat source for the thermal treatment is not limited, and may be an induction heat source, a radiant heat source, a laser, an infrared ("IR") heat source, a microwave, a plasma, ultraviolet ("UV") light, or a surface plasmon, for example.

A selected cooling process is performed on the resulting product after the thermal treatment. The cooling process is performed to uniformly grow and orient the layer of graphene. Because cooling at a high rate may cause the graphene sheet to crack, the cooling process may be desirably performed at a slow rate which may be an accelerating, a decelerating, or a constant rate. For example, the cooling process may be performed at a rate of about 0.1 to about 50° C. per minute, specifically about 0.5 to about 25° C./min, more specifically about 1 to about 15° C./min, or may be performed by, for example, by a natural cooling method. The natural cooling method is to simply remove the heat source used for the thermal treatment to provide cooling by ambient convection. A sufficient cooling rate may be reached by only removing the heat source.

Referring back to FIG. 1, after the first and second graphene sheets 40 and 50, respectively, are formed on the opposite surfaces of the C-metal layer 10 to provide the first metal layer 30 by the above-described processes, the first metal layer 30 may be removed by etching, for example. The etching may be performed using an acid, or by dry etching, for example. As a result, the first graphene sheet 40, which is directly on and is bonded to the first substrate 20, remains, whereas the second graphene sheet 50, which is bound only to the first metal layer 30, is separated from the first substrate 20. The second graphene sheet 50, which is separated from the first substrate 20, may be transferred to a second substrate 60, which may be, for example, a plastic substrate or a silicon wafer, for example.

Alternatively, as is also illustrated in FIGS. 4A and 4B, only the first graphene sheet 40, which is directly on the first substrate, may be selectively obtained. In this embodiment, after the first and second graphene sheets 40 and 50, respectively, are formed, the second graphene sheet 50 may be selectively removed by dry etching. The dry etching may be, for example, reactive ion etching, and may include treatment with $H_2$, a plasma, or $O_2$, for example, as is illustrated in FIG. 4A.

Alternatively, a second metal layer 70, which may solubilize carbon, may further be disposed (e.g., formed) on the C-metal layer 10 before the growing of graphene in order to block the formation of the second graphene sheet 50, as illustrated in FIG. 4B.

A pattern may be pre-formed on the first substrate 20 before the formation of the first and second graphene sheets. The pattern may be formed of the same material as the first substrate 20, or may the pattern comprise a ceramic layer or an oxide layer, for example. If the C-metal layer 10 is disposed on a substrate having a pattern, the C-metal layer 10 may have the same pattern as the substrate, and thus, the first and second graphene sheets formed on the C-metal layer may have the same pattern as the substrate.

Alternatively, instead of patterning the substrate, the C-metal layer on the substrate may be patterned. Before the carburization process, the C-metal layer may be formed on the substrate in a selected pattern, for example in a pattern corresponding to a circuit, by a method such as photolithography with a photomask, or printing, for example.

Alternatively, when the C-metal layer is formed on the substrate by deposition, a selected pattern may be formed on the C-metal layer by using a mask.

If the C-metal layer has a selected pattern, a graphene sheet may be formed on a portion of the substrate, versus being formed on an entire surface of the substrate. For example, a graphene sheet may be formed on a side of a projection or a recession of a substrate, the projection or recession being at an angle with respect to a surface of the substrate.

A graphene sheet prepared by the foregoing method may include a fewer number of wrinkles, fewer defects, may have an improved coverage, and have better uniformity. Therefore, the disclosed method is suitable for forming a large-sized graphene sheet.

A graphene sheet or a graphene base prepared by the method disclosed above may be effectively used in various display devices, such as a field emission display ("FED"), a liquid crystal display ("LCD"), or an organic light emitting device ("OLED"), or a super-capacitor, a fuel cell, or a solar cell, for example, or a nano-device such as a field-effect transistor ("FET"), or a memory device, a transparent electrode, a hydrogen storage device, an optical fiber, or other electrical device, for example.

Hereinafter, embodiments will be disclosed in further detail with reference to the following examples. However, these examples shall not limit the scope of this disclosure.

Example 1

Nickel was deposited by e-beam evaporation on a 5 centimeter (cm) by 2 cm silicon substrate, which was coated with a 100 nm-thick $SiO_2$ layer, to form a nickel (Ni) layer having a thickness of 300 nm on the silicon substrate.

The substrate with the Ni layer was immersed in 100 milliliters (mL) of triethylene glycol, maintained at 240° C. for 30 hours, and then cooled. The substrate was removed from the solution and ultrasonically washed with water, ethanol, and then acetone. The substrate was dried, placed in a reaction chamber under an argon atmosphere, heated at a rate of 100° C. per minute to 900° C., maintained at 900° C. for 30 seconds, and then cooled at a rate of 20° C. per minute to form a graphene sheet.

For analysis purposes, Ni was additionally deposited on the substrate with the graphene sheets to a thickness of about 100 nm and then milled. A cross-section of the resulting structure was analyzed by transmission electron microscopy ("TEM"). The results of the TEM analysis are shown in FIGS. 5A to 5C. FIG. 5B is an enlarged view of interface between nickel film and additionally deposited Ni, which is an upper portion of FIG. 5A, and FIG. 5C is an enlarged view of interface between substrate and Ni film, which is a lower portion. FIGS. 5A to 5C show that graphene sheets were formed on upper and lower opposite surfaces of the metal layer (the Ni layer), respectively. Shown in FIG. 5C is the silicon substrate 200, the first graphene sheet 210, and the e-beam deposited Ni 220. Shown in FIG. 5B is the e-beam evaporated Ni 220, the second graphene sheet 230, and the additionally deposited Ni 240.

The substrate with the graphene sheets was immersed in a 0.01 molar (M) aqueous solution of $FeCl_3$ to remove the e-beam deposited Ni layer, removed from the aqueous $FeCl_3$ solution, and then washed with water to recover the graphene sheet which was grown directly on the substrate. An optical micrograph, a scanning electron micrograph ("SEM"), and a Raman spectrum of the recovered graphene sheet, which was grown between the substrate and the e-beam deposited Ni layer, were obtained. The results are shown in FIGS. 6, 7, and 8, respectively.

Figure 6:
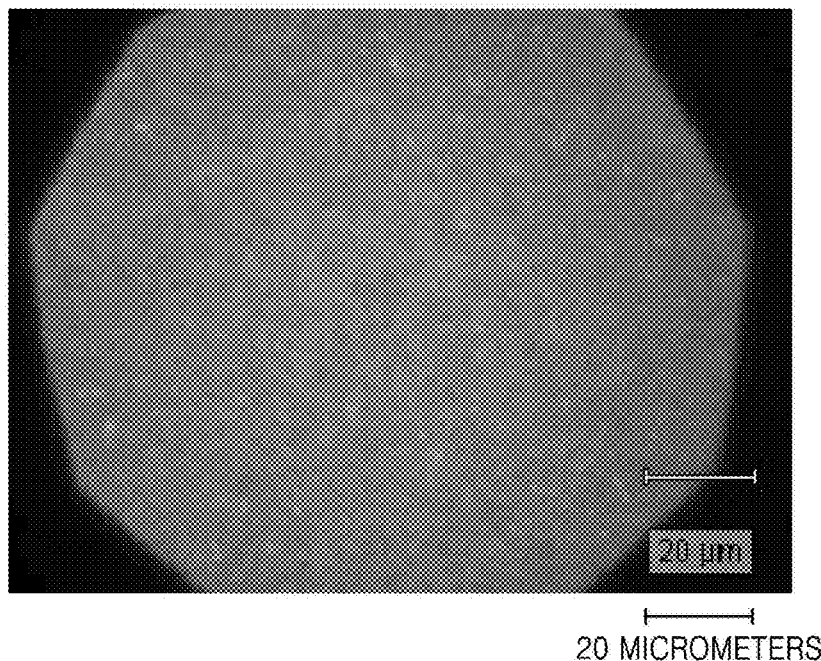
FIG. 6 is an optical micrograph of the graphene sheet prepared in Example 1.
Figure 7:
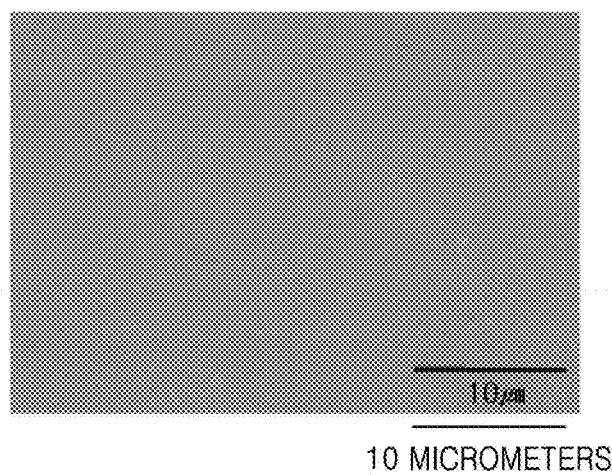
FIG. 7 is a scanning electron micrograph ("SEM") of the graphene sheet prepared in Example 1.

FIG. 6 is an optical micrograph of a 0.01 mm$^2$ area of the graphene sheet. FIG. 6 shows that the imaged area is completely filled with graphene, and devoid of an empty space, void, or other observable defect. For the optical observation, graphene coverage of the graphene sheet manufactured in Example 1 was observed in three portions, each of 0.01 mm$^2$ area. As a result, it was confirmed that 99% or greater of each 1 mm$^2$ area was covered with graphene. In FIG. 7, which is an SEM of the graphene sheet of Example 1, a wrinkle was not observed in an area of 1,000 µm$^2$ when viewed at 30,000 times magnification. The SEM was measured at an accelerating voltage of 20 kV under general SEM conditions.

Figure 8:
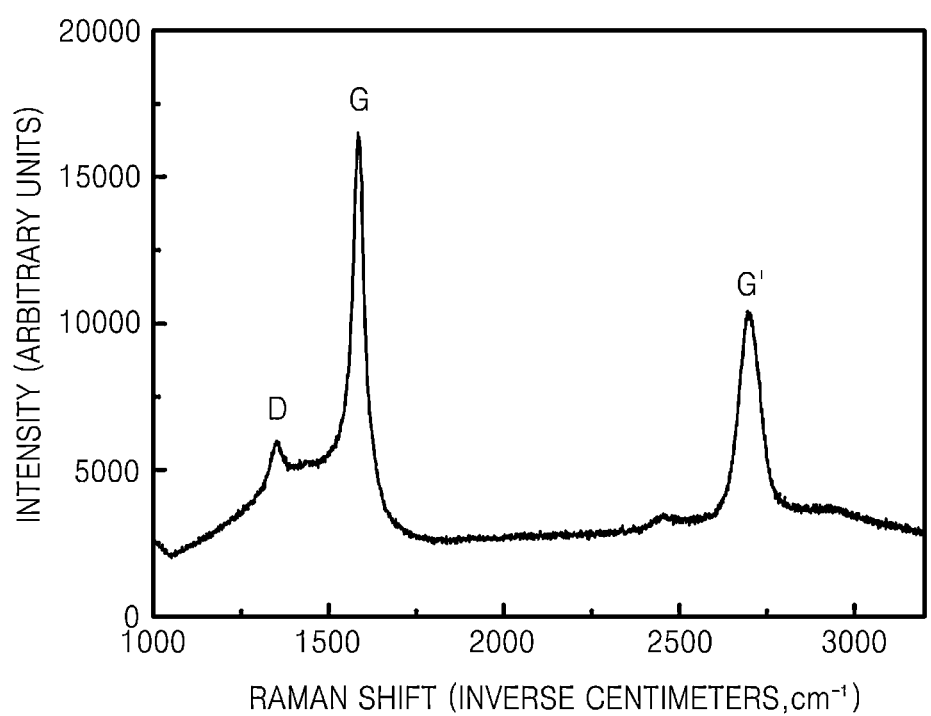
FIG. 8 is graph of intensity (arbitrary units) versus Raman shift (inverse centimeters, cm$^{-1}$) illustrating a Raman spectrum of the graphene sheet prepared in Example 1.

FIG. 8 is a Raman spectrum of the graphene sheet prepared in Example 1. A relative intensity of the D-band to the G-band (i.e., the D-band to G-band peak ratio, $I_D/I_G$) of the graphene sheet was 0.23, indicating that the graphene sheet had crystalline characteristics.

Example 2

Nickel was deposited by e-beam evaporation on a 5 cm by 2 cm silicon substrate, which was coated with a 100 nm-thick $SiO_2$ layer 920, to form an Ni layer having a thickness of 200 nm on the silicon substrate. The Ni layer was patterned to provide a predetermined shape by photolithography to have a width of 200 µm in a center region thereof and a width of 30 µm in edge regions thereof.

The substrate with the patterned Ni layer was immersed in 100 mL of triethylene glycol, maintained at 240° C. for 30 hours and then cooled. The substrate was removed from the solution and ultrasonically washed with water, ethanol, and then acetone. The substrate was dried, placed in a reaction chamber under an argon atmosphere, heated at a rate of 100° C. per minute to 900° C., maintained at 900° C. for 30 seconds, and then cooled at a rate of 20° C. per minute to form patterned graphite sheets.

Figure 9:
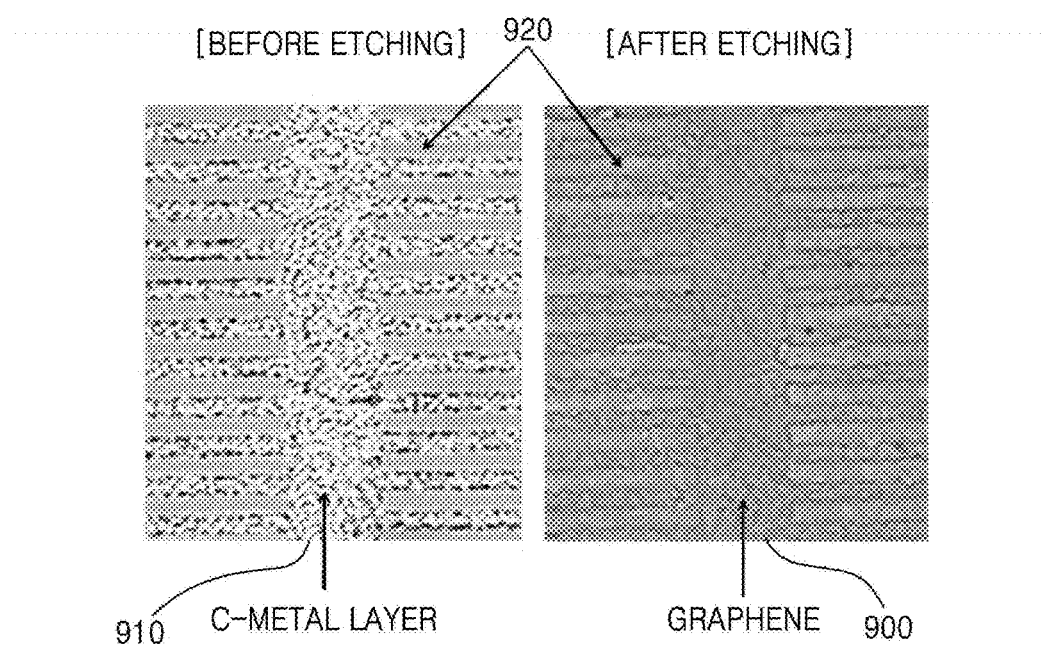
FIG. 9 is a diagram of optical micrographs of a grown graphene pattern using a patterned metal layer in Example 1 before and after the patterned metal layer is etched away.

The substrate with the graphene sheets was immersed in a Ni etchant solution (TFB, available from TRANSENE COMPANY, INC.) to remove the Ni layer, removed from the Ni etchant solution, and then washed with water to recover the graphene sheet grown directly on the substrate. Optical micrographs of the patterned graphene sheet grown between the substrate and the Ni layer were obtained. The results are shown in FIG. 9. Referring to FIG. 9, the graphene sheet 900 that remained after etching had the same pattern as the Ni layer (which resulted from the C-metal layer 910) before etching.

Example 3

Separate Ni and Cu targets and a mixed gas of acetylene and Ar (1% by volume acetylene in Ar) were sputtered at a power of 700 watts (W) onto a 4" diameter silicon substrate, which was coated with a 100 nm-thick $SiO_2$ layer, then heated in a $H_2$ atmosphere at 500° C. for 10 minutes, and then heated in an Ar atmosphere at 1000° C. for 30 seconds to provide the substrate with graphene sheets.

The substrate with the graphene sheets was immersed in a 0.01 M aqueous solution of $FeCl_3$ to remove the Ni/Cu metal layer, removed from the aqueous solution, and then washed with water to recover the graphene sheet grown directly on the substrate. An optical micrograph and a Raman spectrum of the recovered graphene sheet, which had been grown between the substrate and the Ni layer, were obtained. The results are shown in FIGS. 10A and 10B.

Figure 10A:
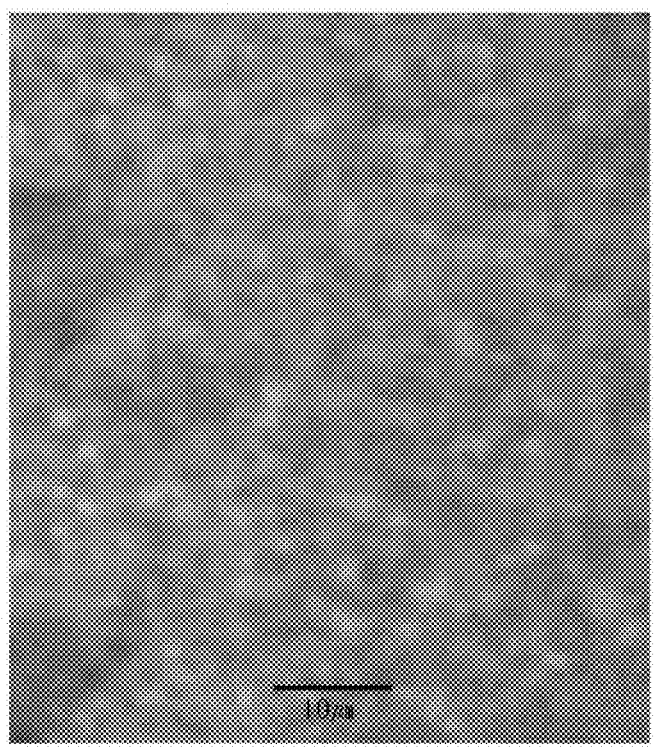
FIGS. 10A and 10B are respectively an optical micrograph and graph of intensity (arbitrary units) versus Raman shift (inverse centimeters, cm$^{-1}$) illustrating a Raman spectrum of a graphene sheet prepared in Example 3.
Figure 10B:
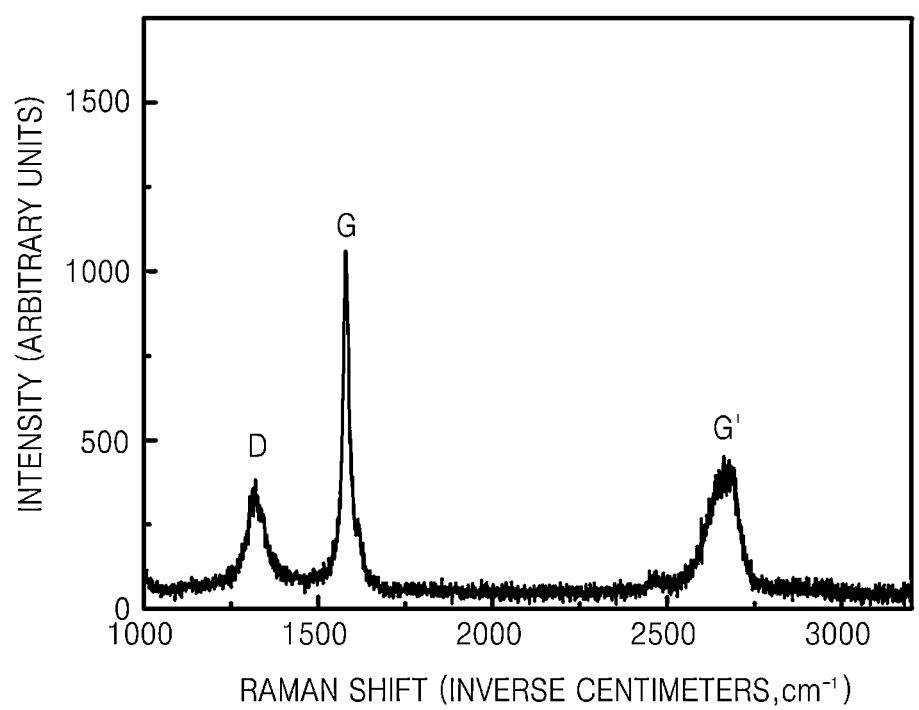

FIG. 10A is an optical micrograph of a 0.01 mm² area of the graphene sheet. FIG. 10A shows that the imaged area is completely filled with graphene, and devoid of an empty space or void. For the optical observation, the entire area of the graphene sheet manufactured in Example 3 was observed in 0.01 mm² portions for each observation. As a result, it was confirmed that 99% or greater of each 1 mm² area was covered with graphene. FIG. 10B is a Raman spectrum of the graphene sheet of Example 3. A relative intensity of the D-band to the G-band (i.e., the D-band to G-band peak ratio, $I_D/I_G$) of the graphene sheet was 0.25, indicating that the graphene sheet had crystalline characteristics.

Comparative Example 1

Nickel was deposited by e-beam evaporation on a 3 cm by 3 cm silicon substrate, which was coated with a 100 nm-thick $SiO_2$ layer, to form a Ni layer having a thickness of 300 nm on the silicon substrate.

The silicon substrate with the Ni layer was treated in a hydrogen atmosphere at 900° C. for 20 minutes (for comparison purposes), and $H_2$ and $C_2H_2$ were supplied in a volume ratio of 45:2 for 1 minute to grow graphene sheets thereon. Then, the temperature was reduced. The substrate with the graphene sheets was immersed in a 0.01 M aqueous solution of $FeCl_3$ to remove the Ni layer, and the graphene sheet floating on the surface of the aqueous solution was transferred to a silica/silicon substrate. An optical micrograph and a SEM of the transferred graphene sheet were obtained. The results are shown in FIGS. 11A and 11B.

Figure 11A:
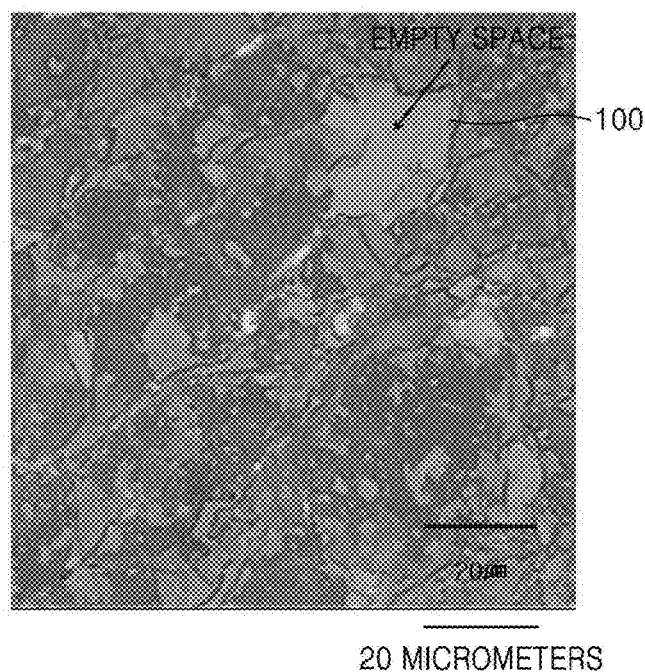
FIGS. 11A and 11B are respectively an optical micrograph and a SEM of a graphene sheet prepared in Comparative Example 1.
Figure 11B:
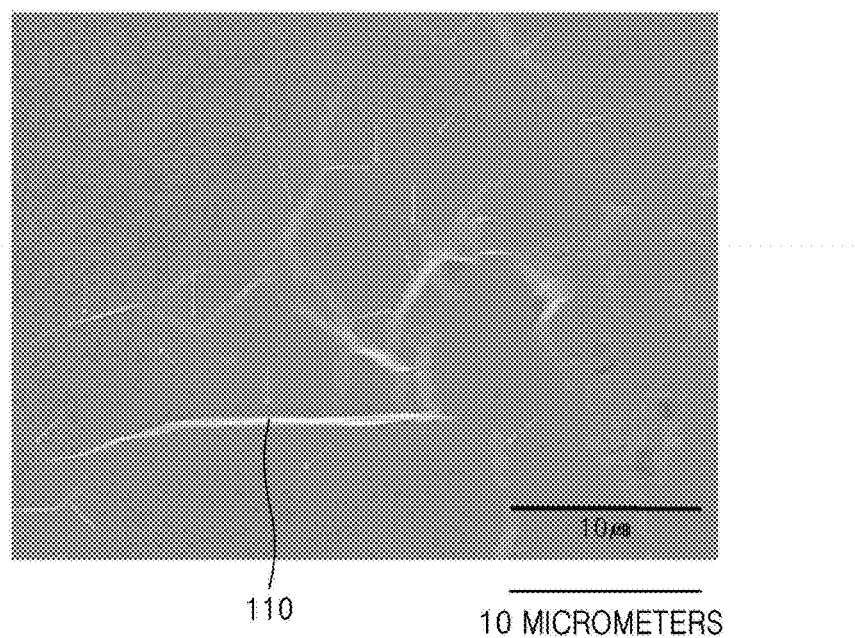

FIG. 11A is an optical micrograph of a 0.01 mm² area of the graphene sheet including an empty space 100 of about 400 μm². For the optical observation, the entire area of the graphene sheet manufactured in Comparative Example 1 was observed in 0.01 mm² portions for each observation. As a result, it was confirmed that about 85% of each 1 mm² area of the graphene sheet was covered with graphene. In FIG. 11B, about 16 wrinkles 110 were counted in a 1000 μm² area, as denoted.

As described above, according to an embodiment, a large-sized graphene sheet including fewer wrinkles and having improved purity may be manufactured. The graphene sheet may be formed directly on a substrate. The graphene sheet is applicable to various fields, including electrical devices.

It should be understood that the embodiments disclosed herein shall be considered in a descriptive sense only and not for purposes of limitation. Descriptions of features, advantages, or aspects of each embodiment should be considered as available for other similar features or aspects in other embodiments.

What is claimed is:

1. A graphene sheet comprising:
   graphene comprising ten or fewer wrinkles per 1,000 square micrometers of the graphene,
   wherein the graphene comprises an area of 1000 square micrometers in which a wrinkle is not observed when analyzed by scanning electron microscopy at 30,000 times magnification,
   wherein the graphene has an area of 1 square millimeter or greater, and
   wherein the graphene sheet a thickness of about 0.3 to about 3.3 nanometers, and
   wherein the graphene sheet has a thickness corresponding to about 1 to about 10 layers of graphene.

2. The graphene sheet of claim 1, having a graphene coverage of about 99% or greater per 1 square millimeter area of the graphene sheet.

3. The graphene sheet of claim 1, having a three-dimensional shape.

4. The graphene sheet of claim 1, consisting essentially of graphene.

5. A graphene base comprising:
   a substrate; and
   a graphene sheet directly on a surface of the substrate, the graphene sheet comprising graphene and having about 10 or fewer wrinkles per 1,000 square millimeters of the graphene sheet,
   wherein the graphene comprises an area of 1000 square micrometers in which a wrinkle is not observed when analyzed by scanning electron microscopy at 30,000 times magnification, and
   wherein the graphene sheet a thickness of about 0.3 to about 3.3 nanometers, and
   wherein the graphene sheet has a thickness corresponding to about 1 to about 10 layers of graphene.

6. The graphene base of claim 5, wherein the graphene sheet has an area of about 1 square millimeter or greater.

7. The graphene base of claim 5, wherein a graphene coverage of the graphene sheet is about 99% or greater per 1 square millimeter area of the graphene sheet.

8. The graphene base of claim 5, wherein the substrate comprises a patterned layer on at least one surface thereof.

9. The graphene base of claim 8, wherein the graphene sheet has a pattern corresponding to a pattern of the patterned layer.

10. A graphene sheet comprising:
    graphene, wherein a graphene coverage of the graphene sheet is about 99% or greater per 1 square millimeter area of the graphene sheet,
    wherein the graphene comprises ten or fewer wrinkles per 1,000 square micrometers of the graphene,
    wherein the graphene comprises an area of 1000 square micrometers in which a wrinkle is not observed when analyzed by scanning electron microscopy at 30,000 times magnification, and
    wherein the graphene sheet a thickness of about 0.3 to about 3.3 nanometers, and
    wherein the graphene sheet has a thickness corresponding to about 1 to about 10 layers of graphene.

11. The graphene sheet of claim 10, having an area of 1 square millimeter or greater.

12. A graphene base comprising:
    a substrate; and
    a graphene sheet directly on a surface of the substrate, wherein a graphene coverage of the graphene sheet is about 99 percent or greater per 1 square millimeter area of the graphene sheet,
    wherein the graphene comprises an area of 1000 square micrometers in which a wrinkle is not observed when analyzed by scanning electron microscopy at 30,000 times magnification, and
    wherein the graphene sheet a thickness of about 0.3 to about 3.3 nanometers, and
    wherein the graphene sheet has a thickness corresponding to about 1 to about 10 layers of graphene.

13. The graphene base of claim 12, wherein the graphene sheet has an area of about 1 square millimeter or greater.

14. The graphene base of claim 12, wherein the substrate comprises a patterned layer on at least one surface thereof.

15. The graphene base of claim 14, wherein the graphene sheet has a pattern corresponding to a pattern of the patterned layer.

16. A graphene base comprising:
a substrate;
a first graphene sheet disposed on at least one surface of the substrate;
a metal layer disposed on the first graphene sheet; and
a second graphene sheet disposed on the metal layer,
wherein at least one of the first graphene sheet and the second graphene sheet includes about 10 or fewer wrinkles 1,000 square micrometers of graphene,
wherein the graphene comprises an area of 1000 square micrometers in which a wrinkle is not observed when analyzed by scanning electron microscopy at 30,000 times magnification, and
wherein the graphene sheet a thickness of about 0.3 to about 3.3 nanometers, and
wherein the graphene sheet has a thickness corresponding to about 1 to about 10 layers of graphene.

17. The graphene base of claim 16, wherein each of the first graphene sheet and the second graphene sheet includes about 10 or fewer wrinkles 1,000 square micrometers of graphene.

18. The graphene base of claim 16, wherein each of the first graphene sheet and the second graphene sheet has an area of about 1 square millimeter or greater.

19. The graphene base of claim 16, wherein a graphene coverage of at least one of the first graphene sheet and the second graphene sheet is about 99% or greater per 1 square millimeter area of the first graphene sheet or the second graphene sheet, respectively.

20. The graphene base of claim 16, wherein the substrate comprises a patterned layer on at least one surface thereof.

21. The graphene base of claim 20, wherein the metal layer has a pattern corresponding to a pattern of the patterned layer of the substrate.

22. The graphene base of claim 16, wherein each of the first graphene sheet and the second graphene sheet has a pattern corresponding to the pattern of the metal layer.

23. The graphene base of claim 16, wherein the metal layer comprises a graphitizing catalyst.

24. A method of preparing a graphene sheet, the method comprising:
forming a carbon incorporated metal layer on at least one surface of a substrate; and
thermally treating the substrate and the carbon incorporated metal layer to form first and second graphene sheets on opposite surfaces of a resulting metal layer to form a graphene sheet comprising ten or fewer wrinkles per 1,000 square micrometers of the graphene,
wherein the graphene comprises an area of 1000 square micrometers in which a wrinkle is not observed when analyzed by scanning electron microscopy at 30,000 times magnification, and
wherein the graphene sheet a thickness of about 0.3 to about 3.3 nanometers, and
wherein the graphene sheet has a thickness corresponding to about 1 to about 10 layers of graphene.

25. The method of claim 24, wherein the forming of the carbon incorporated metal layer comprises:
forming a first metal layer on at least one surface of the substrate; and
carburizing the first metal layer to form the carbon incorporated metal layer.

26. The method of claim 24, wherein the forming of the carbon incorporated metal layer comprises simultaneously disposing a metal and carbon on at least one surface of the substrate.

27. The method of claim 24, wherein the forming of the carbon incorporated metal layer comprises disposing a carbide on at least one surface of the substrate.

28. The method of claim 24, further comprising forming a second metal layer on the carbon incorporated metal layer.

29. The method of claim 24, further comprising cooling the first and second graphene sheets at a rate of about 0.1 to about 50° C. per minute after the thermally treating.

30. The method of claim 24, wherein the thermally treating is performed at a temperature of about 350 to about 1,300° C. for about 0.01 to about 1 hour.

31. The method of claim 24, further comprising dry etching the first and second graphene sheets using $H_2$, plasma, or $O_2$ to remove the second graphene sheet.

32. The method of claim 29, further comprising treating the resulting metal layer with an acid after the cooling to remove the resulting metal layer, which remains after the thermally treating, to provide the first graphene sheet directly on the substrate, and the second graphene sheet separated from the substrate.

33. The method of claim 29, wherein the first graphene sheet is bonded to the substrate.

34. The method of claim 32, further comprising transferring the separated second graphene sheet to another substrate.

* * * * *